United States Patent
Li et al.

(10) Patent No.: US 10,322,937 B2
(45) Date of Patent: Jun. 18, 2019

(54) DOPING AGENTS FOR USE IN CONJUGATED POLYMER EXTRACTION PROCESS OF SINGLE WALLED CARBON NANOTUBES

(71) Applicant: NATIONAL RESEARCH COUNCIL OF CANADA, Ottawa (CA)

(72) Inventors: Zhao Li, Orleans (CA); Jianfu Ding, Orleans (CA); Patrick Roland Lucien Malenfant, Orleans (CA)

(73) Assignee: National Research Council of Canada, Ottawa (CA)

( * ) Notice: Subject to any disclaimer, the term of this patent is extended or adjusted under 35 U.S.C. 154(b) by 8 days.

(21) Appl. No.: 15/612,538

(22) Filed: Jun. 2, 2017

(65) Prior Publication Data

US 2018/0346335 A1    Dec. 6, 2018

(51) Int. Cl.
*C01B 32/159* (2017.01)
*B01D 11/02* (2006.01)

(52) U.S. Cl.
CPC ........ *C01B 32/159* (2017.08); *B01D 11/0288* (2013.01); *C01B 2202/02* (2013.01); *C01B 2202/22* (2013.01)

(58) Field of Classification Search
CPC .............. C01B 32/159; C01B 2202/22; C01B 2202/02; B01D 11/0288
See application file for complete search history.

(56) References Cited

U.S. PATENT DOCUMENTS

| | | |
|---|---|---|
| 7,641,883 B2 | 1/2010 | Shin et al. |
| 7,785,472 B2 | 8/2010 | Murakoshi |
| 8,193,430 B2 | 6/2012 | Papadimitrakopoulos et al. |
| 8,703,092 B2 | 4/2014 | Ziegler |
| 8,894,963 B2 | 11/2014 | Sue et al. |
| 2008/0217588 A1 | 9/2008 | Arnold et al. |
| 2010/0111814 A1 | 5/2010 | Doorn et al. |
| 2010/0176349 A1 | 7/2010 | Schmidt et al. |
| 2012/0286215 A1 | 11/2012 | Rao et al. |
| 2013/0336874 A1 | 12/2013 | Chan et al. |
| 2014/0199229 A1 | 7/2014 | Strano et al. |
| 2016/0200578 A1 | 7/2016 | Ding et al. |

OTHER PUBLICATIONS

Lu, Jing, et al. "Selective interaction of large or charge-transfer aromatic molecules with metallic single-wall carbon nanotubes: critical role of the molecular size and orientation." Journal of the American Chemical Society 128.15 (2006): 5114-5118.*

(Continued)

*Primary Examiner* — Richard M Rump
(74) *Attorney, Agent, or Firm* — Aventum IP Law LLP

(57) ABSTRACT

A method for modulation of yield and semiconducting (sc)-purity of single-walled carbon nanotubes (SWCNTs) in a conjugated polymer extraction (CPE) process, the method comprising addition of an n-type dopant or a p-type dopant to the CPE process, wherein: the n-type dopant has a reduction potential of between −4.2 eV and −3.0 eV; and the p-type dopant has a reduction potential of between −6.0 eV and −4.5 eV.

18 Claims, 5 Drawing Sheets

(56) References Cited

OTHER PUBLICATIONS

Kim, Soo Min, et al. "Reduction-controlled viologen in bisolvent as an environmentally stable n-type dopant for carbon nanotubes." Journal of the American Chemical Society 131.1 (2008): 327-331.*
Kim, Sang N., Zhengtang Luo, and Fotios Papadimitrakopoulos. "Diameter and metallicity dependent redox influences on the separation of single-wall carbon nanotubes." Nano letters 5.12 (2005): 2500-2504.*
Chattopadhyay, Debjit et al—"A Route for Bulk Separation of Semiconducting from Metallic Single-Wall Carbon Nanotubes"; Jacs Articles, Published on web Feb. 22, 2003, ACS-2003, 125,— pp. 3370-3375.
Ding, Jiangfu et al—"Enrichment of large-diameter semiconducting SWCNTs by polyfluorene extraction for high network density thin film transistors"; Royal Society of Chemistry, Nanoscale 2014, 6, pp. 2328-2339.
Ding, Jiangfu et al—"A Hybrid enrichment process combining conjugated polymer extraction and silica gel adsorption or high purity semiconducting single-walled carbon nanotubes (SWCNT)"; Royal Society of Chemistry, Nanoscale 2015, 7, pp. 15741-15747.
Ding, Jiangfu et al—"Mechanistic Consideration of pH Effect on the Enrichment of Semiconducting SWCNTs by Conjugated Polymer Extraction"; ACS Publications, The Journal of Physical Chemistry; 2016, 120, pp. 21946-21954.
Widianta Gomulya et al—"Semiconducting Single-Walled Carbon Nanotubes on Demand by Polymer Wrapping"; 2013—Wiley-VCH Verlag GmbH & Co, Advanced Materials, 2013, 25—pp. 2948-2956.

Gui, Hui et al—"Redox Sorting of Carbon Nanotubes"; ACS Publications, NANO Letters; 2015, 14, pp. 1642-1646.
Atsushi Hirano et al—"pH- and Solute-Dependent Adsorption of Single-Walled Carbon Nanotubes onto Hydrogels: Mechanistic Insights into the Metal/Semiconductor Separation"; ACS Publications; ACS Nano 2013, vol. 7, No. 11, pp. 10285-10295.
Hwang, Jeong-Yuan et al—"Polymer Structure and Solvent Effects on the Selective Dispersion of Single-Walled carbon Nanotubes"; Jacs Articles, Published on web Feb. 23, 2008, ACS-2008, 130, pp. 3543-3553.
Sang-Yong Ju et al—"Enrichment Mechanism of Semiconducting Single-Walled Carbon Nanotubes by Surfactant Amines"; Jacs Articles, Published on web Apr. 27, 2009, ACS-2009, 131, pp. 6775-6784.
Kevin S. Mistry et al—"High-Yield Dispersions of Large-Diameter Semiconducting Single-Walled Carbon Nanotubes with Tunable Narrow Chirality Distributions"; ACS Publications, 2013, vol. 7, No. 3, pp. 2231-2239.
Huiliang Wang et al—"N-Type Conjugated Polymer-Enabled Selective Dispersion of Semiconducting Carbon Nanotubes for Flexible CMOS-Like Circuits"; 2015—Wiley-VCH Verlag GmbH & Co, Advanced Functional Materials, 2015, 25—pp. 1837-1844.
Huiling Wang et al—"Solvent Effects on Polymer Sorting of Carbon Nanotubes with Applications in Printed Electronics"; 2014—Wiley-VCH Verlag GmbH & Co,; Carbon Nanotubes, 2015, 11, No. 1—pp. 126-133.
Jing Wang et al—"Selective Surface Charge Sign Reversal on Metallic Carbon Nanotubes for Facile Ultrahigh Purity Nanotube Sorting"; ACS Publications, ACS Nano; 2016, 10, pp. 3222-3232.
Hongliu Yang et al—"Diameter-Selective Dispersion of Carbon Nanotubes via Polymers: A Competition between Adsorption and Bundling"; ACS Publications, ACS Nano; 2015, pp. 9012-9019.

* cited by examiner

DOPING AGENTS FOR USE IN CONJUGATED POLYMER EXTRACTION PROCESS OF SINGLE WALLED CARBON NANOTUBES

TECHNICAL FIELD

The present disclosure relates to the purification of single-walled carbon nanotubes (SWCNT). In particular, it relates to conjugated polymer extraction (CPE) for enrichment of semiconducting single-walled carbon nanotubes (sc-SWCNT).

BACKGROUND

The background description includes information that may be useful in understanding the present invention. It is not an admission that any of the information provided herein is prior art or relevant to the presently claimed invention, or that any publication specifically or implicitly referenced is prior art.

As new emerging materials, single-walled carbon nanotubes (SWCNTs) have recently attracted extensive research interest due to their specific electrical, optical and mechanical properties. For different applications, the raw SWCNT materials have to be purified and enriched, as they contain metallic (m) and semiconducting (sc) single-walled carbon nanotubes, amorphous carbon, catalyst and other impurities. For example, sc-SWCNTs can be used as the active channel materials in field effect transistors (FET) in logic circuit and other electrical devices.

Recently, conjugated polymer extraction (CPE) processes have been developed to purify single walled carbon nanotube (SWCNT) raw materials. Compared with other surfactant-based methods, such as density gradient ultra-centrifugation (DGU), gel chromatography and biphasic separation, CPE is simple, scalable and cost effective, thus possessing properties that are highly desirable for industrial applications. More importantly, the dispersed product is obtained as an organic solvent-based dispersion with relatively high tube content (e.g. up to ~20%-50%). This leads to additional benefits in the application of SWCNT materials in device fabrication and performance.

While CPE produces enriched sc-SWCNT materials with a purity higher than 99%, the low yield for a single extraction, which renders the CPE time consuming. Furthermore, the cost of the conjugated polymer may be high due to the low yield. Another challenge is that current CPE processes have no chirality selectivity. That is, the resulting product is usually a mixture of SWCNTs with different chiralities. This is an issue in some fields of application in which narrow or even single chirality SWCNTs are required for band gap control.

Furthermore, the interaction between conjugated polymers and SWCNTs is still not clear. As such, the mechanism of the CPE process is elusive. In order to achieve enrichment, the interaction between the conjugated polymer and SWCNTs should be strong enough to form a stable complex in solvents. In addition, the solubility of the complex must be sufficient to form a stable solution. This solubility is related to the backbone and side chain structure of the conjugated polymer. Furthermore, this process should be selective such that only the sc-SWCNTs are stable in solution.

These objectives require a fine-tuned balance between the raw tube materials, the structure of the conjugated polymer and solvent. However, this balance is difficult to control. For example, to improve the yield and purity of the CPE by adjusting the polymer structure is still quite difficult. The cost to synthesize a new conjugated polymer can be quite high, especially when complicated structures are used. As such, there are no general rules on polymer structure design for a CPE process; current techniques are still based on trial and error.

While solvents can affect the purification process, the selection of solvents is limited due to solubility issues. Furthermore, while addition of a redox agent can affect enrichment process, most of the experiments and results are for aqueous system. For example, it has been found that redox chemistry and pH affect the sorting of SWCNTs in aqueous system (see, e.g., Ju, S.-Y.; Utz, M.; Papadimitrakopoulos, F., *J. Am. Chem. Soc.* 2009, 131, 6775-6784, "Enrichment Mechanism of Semiconducting Single-Walled Carbon Nanotubes by Surfactant Amines"; Wang, J.; Nguyen, T. D.; Cao, Q.; Wang, Y.; Tan, M. Y. C.; Chen-Park, M. B., *ACS Nano* 2016, 10, 3222-3232, "Selective Surface Charge Sign Reversal on Metallic Carbon Nanotubes for Facile Ultrahigh Purity Nanotube Sorting"; and Hirano, A.; Tanaka, T.; Urabe, Y. Kataura, Hiromichi, *ACS Nano* 2013, 7 (11), 10285-10295, "pH- and Solute-Dependent Adsorption of Single-Wall Carbon Nanotubes onto Hydrogels: Mechanistic Insights into the Metal/Semiconductor Separation". In addition, it has been found that redox molecules trigger reorganization of a surfactant coating layer on SWCNTs in aqueous two-phase systems.

In addition, Gui H, et al., have disclosed (see "Redox Sorting of Carbon Nanotubes", *Nano Lett.* 2015, 15, 1642 1646) the use of redox dopants for sorting carbon nanotubes, particularly for separating sc-SWCNT from m-SWCNT. The redox dopants are used in conjunction with polymer sorting processes, including polyfluorenes and related polymer structures. In particular, Gui et al disclose the use of vitamin E (10 mM) as a reductant and water (10% v/v) as an oxidant in polyfluorene extraction systems, and $NaBH_4$ and $HClO$ in polyethylene glycol/dextran systems.

In addition, Ding et al. have reported that adjusting of surface acidity of SWCNTs by addition of sodium hydroxide dramatically influences the CPE process (see *J. Phys. Chem. C* 2016, 120, 21946-21945). The selective mechanism of semiconducting vs metallic CNTs has been attributed to oxygen doping at ambient conditions, which preferentially cause the bundling of highly polarizable metallic (m) tubes.

US 2010/176349 discloses that redox agents may be used to separate sc-SWCNT from m-SWCNT. Such selective redox chemistry may also be used to fractionate sc-SWCNT based on chirality. The redox agents listed in this document are all metals or metal ions, especially iron, copper and gold, while there is no discussion that such redox chemistry may be used in conjunction with a polymer extraction process.

U.S. Pat. No. 7,641,883 discloses the use of benzyl viologen for the selective separation of sc-SWCNTs from m-SWCNTs, though not in conjunction with a polymer extraction process.

US 2013/336874 discloses the use of quinones for selective separation of carbon nanotubes, especially sc-SWCNTs, though not in conjunction with a polymer extraction process.

U.S. Pat. No. 8,193,430 discloses the use of a reducing agent (e.g. hydrazine) in conjunction with flavins (conjugated molecule) for selectively dispersing SWCNTs.

US 2010/11814 discloses the use of a separation medium that is involved in a redox reaction with carbon nanotubes to effect selective separation of carbon nanotubes with different characteristics. Organic redox agents include azobenzene and tetracyanoquinodimethane. There is no teaching that the method may be used in conjunction with a polymer extraction process.

US 2012/286215 and Hwang J-Y, et al. ("Polymer Structure and Solvent Effects on the Selective Dispersion of Single-Walled Carbon Nanotubes", *J. Am. Chem. Soc.*, 2008, 130, 3543-3553) disclose a conjugated polymer enrichment process performed in water.

For a CPE-based organic system, vitamin E (at one concentration) and water have been tested, in which no detailed yield or purity data were provided. No guidance has been provided on how to effectively adjust the concentration of the redox agent, or how select doping agents in order to fine-tune the enrichment process.

Disclosed herein is a method for improving the yield and/or selectivity of a specific kind of SWCNT, in which a dopant is added during each extraction step of a CPE process. The method can be used to separate metallic single-walled carbon nanotubes (m-SWCNTs) from sc-SW-CNTs and/or to enrich sc-SWCNT having a particular chirality. For example, the use of organic dopants (instead of the oxygen/water redox couple) can be used to modulate both the yield and purity of SWCNTs from the CPE of raw tube materials.

Various objects, features, aspects and advantages of the inventive subject matter will become more apparent from the following detailed description of preferred embodiments, along with the accompanying drawing figures.

SUMMARY

In one aspect of the present invention, there is provided a method for modulation of yield and semiconducting (sc)-purity of single-walled carbon nanotubes (SWCNTs) in a conjugated polymer extraction (CPE) process, the method comprising addition of an n-type dopant or a p-type dopant to the CPE process, wherein: the n-type dopant has a reduction potential of between −4.2 eV and −3.0 eV; and the p-type dopant has a reduction potential of between −6.0 eV and −4.5 eV.

In another aspect of the present invention, there is provided a method for enhancement of yield of sc-SWCNTs in a conjugated polymer extraction (CPE) process, the method comprising addition of an n-type dopant to the CPE process, wherein the n-type dopant has a reduction potential between −4.2 eV and −3.0 eV.

In yet another aspect of the present invention, there is provided a method for enhancement of sc-purity or chiral selectivity of single-walled carbon nanotubes (SWCNTs) in a conjugated polymer process (CPE), the method comprising addition of a p-type dopant to the CPE process, wherein the p-type dopant has a has a reduction potential of between −6.0 eV and −4.5 eV.

In the above methods, the dopant concentration may be between 0.001 mM and 100 mM, or between 0.01 mM and 7.5 mM. Furthermore, the weight ratio of the dopant to the SWCNTs may be from about 0.0001 to about 100. In another measure of dopant to SWCNT, the atom ratio of the dopant to the carbon of the SWCNTs may be from about 0.0001 to about 0.5.

The conjugated polymer can have the following structure:

-[A$_x$-B$_y$]$_m$-, where x=0, 1, 2, 3, 4 and y=0, 1, 2, 3, 4, such that x and y do not both=0; m=5-50000; and A and B are repeating units, that are independently selected from thiophene, bithophene, phenylene, pyridine, bipyridine, anthracene, naphthalene, benzothiadiazole, benzanthracene, ketone, carbazole, fluorene, spirobifluorene, phenanthrene, dehydrophenanthrene, triazine, imidazole, tetrazine, pyrimidine, pyridazine, pyrazine, oxadiazole, quinolone, quinoxaline, pyrene, perylene, benzimidazole, phosphinoxide, phenazine, phenanthroline, triarylborane, 1,4-phenylene-dinitrilomethine and derivatives thereof. Furthermore, as an example, m=50-500. As a further example, x=y=1. In addition, A and B can independently be selected from thiophene, pyridine, benzothiadiazole, fluorene and deriviatives thereof. Further examples include the case where A and B can independently be

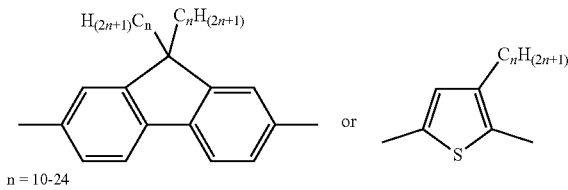

n = 10-24

Furthermore, the conjugated polymer may comprise fluorene or thiophene units. Or the conjugated polymer may be a polyfluorene or a polythiophene. As an example, the conjugated polymer may be poly(9,9-di-n-dodecylfluorine) (PFDD).

In the above methods where an n-type dopant is used, addition of the n-type dopant can increase the yield of SWCNTs of the CPE process. The concentration of the n-type dopant can be between 0.01 mM and 7.5 mM, or from 0.05 mM to 7.5 mM. Examples of n-type dopants include phenyl hydrazine or benzyl viologen.

In the above methods where a p-type dopant is used, addition of the p-type dopant may increase the sc-purity or chiral selectivity of CPE process. The concentration of the p-type dopant can be between 0.01 mM and 7.5 mM, or from 0.05 mM to 7.5 mM. Examples of the p-type dopant include benzoyl peroxide (BP) and 2,3-dichloro-5,6-dicyano-p-benzoquinone (DDQ).

DETAILED DESCRIPTION

It has been found that addition of a small amount of a doping agent can affect the yield and purity of SWCNT products during a CPE process. The doping agents can be n-type (i.e. donate electrons); for example phenyl hydrazine (PHz) and benzyl viologen (BV):

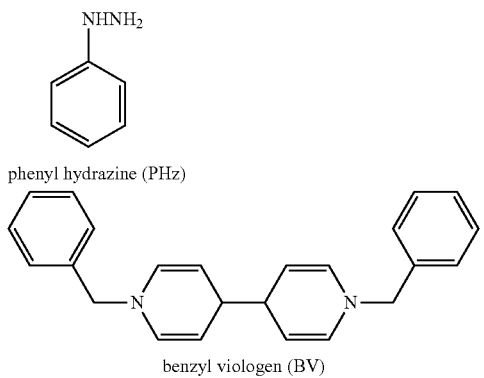

phenyl hydrazine (PHz)

benzyl viologen (BV)

The doping agents can also be p-type (i.e. withdraw electrons), such as for example benzoyl peroxide (BPO) or 2,3-dichloro-5,6-dicyano-p-benzoquinone (DDQ):

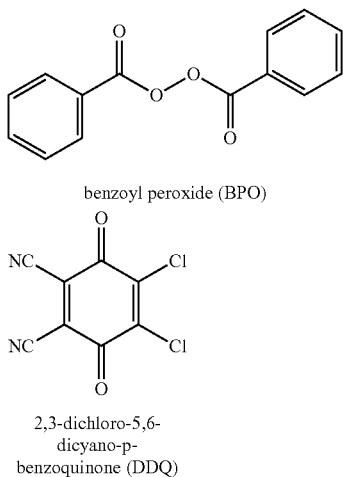

benzoyl peroxide (BPO)

2,3-dichloro-5,6-dicyano-p-benzoquinone (DDQ)

The structure of each of the four dopants shown above, contain benzene rings, which may improve both their solubility in an organic solvent (for example, toluene) and affinity to SWCNTs.

Figure 1:
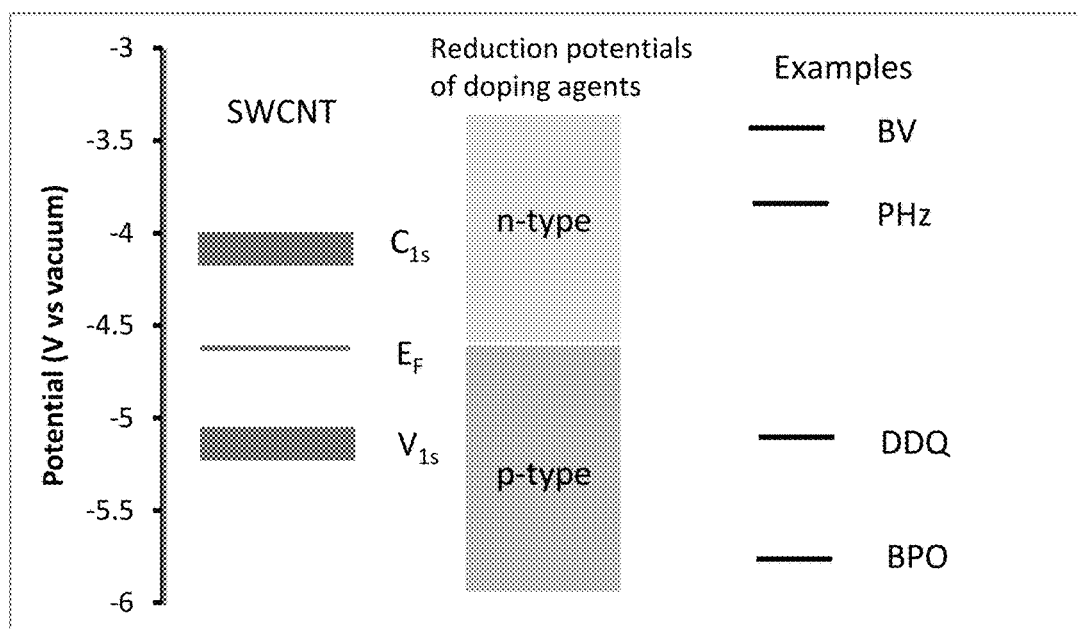
FIG. 1 illustrates energy levels of SWCNTs and doping agents.

As a rough guide, the type of doping agent may be selected based on the reduction potential of the doping agent relative to the reduction potential of the nanotube raw materials, which is approximately −4.5 eV. This is shown in FIG. 1 which illustrates the energy levels of SWCNTs and doping agents. BV and PHz each have reduction potentials that are higher than that of SWCNTs, while DDQ and BPO each have reduction potentials that are lower than that of SWCNTs.

Figure 2:
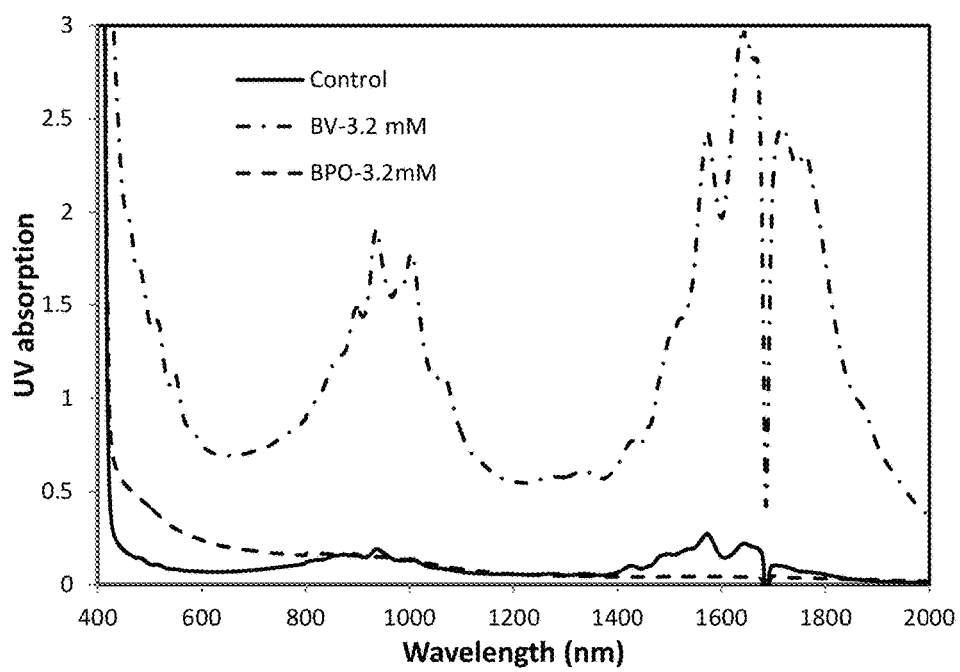
FIG. 2 illustrates UV-absorption spectra of an enriched SWCNT dispersion for a control sample compared to samples with doping agents.

During a CPE process (without dopant), the first extraction usually has a low SCWNT yield. It was found that with the addition of an n-type doping agent, such as PHz or BV, the yield increases from 0.3% (without dopant) to approximately 2% in the first extraction step. This improvement in yield is even greater in the next extraction steps. FIG. 2 illustrates UV-absorption spectra of an enriched SWCNT dispersion in toluene from a second extraction using poly (9,9-di-n-dodecylfluorene) (PFDD), comparing a control sample (no doping agent added) to one sample having the addition of 3.2 mM benzyl viologen (BV) n-doping agent; and to a second sample having the addition of 3.2 mM benzoyl peroxide (BPO) p-doping agent. Since the UV absorption is not normalized, the peak intensity is directly related to the SWCNT concentration, and thus the yield. As shown in FIG. 2, the addition of BV increases the yield relative to the regular CPE process, while the addition of BPO reduces the yield. In terms of yield percentage, the spectra in FIG. 2 correspond to a yield of 1.3% for a regular CPE process; a yield of 5% with the addition of 3.2 mM of BV; and a yield of 0.3% with the addition of 3.2 mM BOP.

Figure 3:
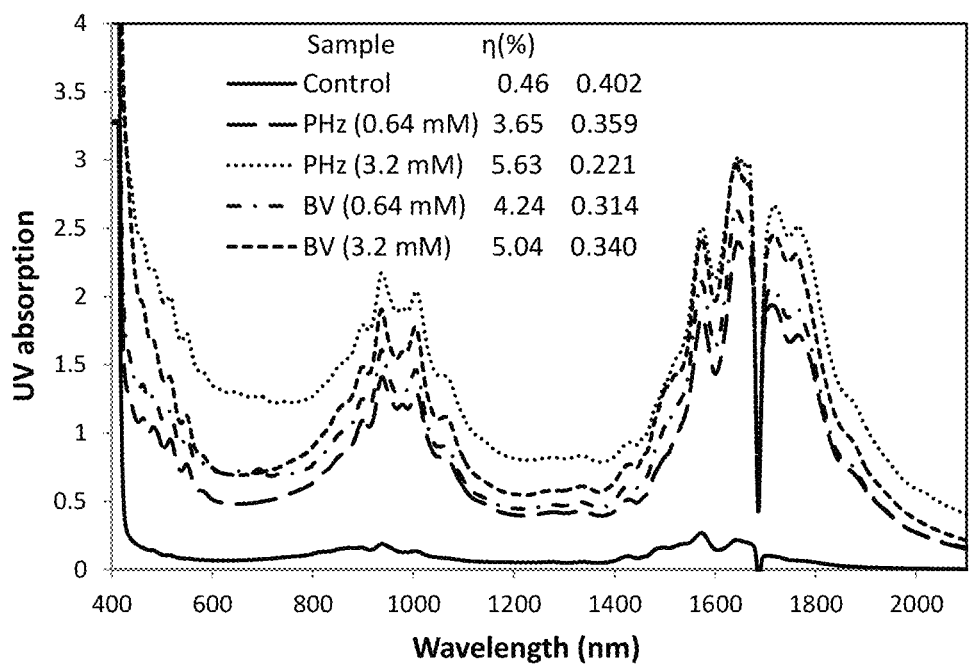
FIG. 3 illustrates UV-absorption spectra of an enriched SWCNT dispersion for a control sample compared to samples with n-type doping agents.

FIG. 3 illustrates absorption spectra of an enriched SWCNT dispersion for a control sample compared to samples with n-type doping agents after a second extraction. The control sample is an enriched SWCNT dispersion in toluene from a second extraction using PFDD, without the use of a dopant. The four remaining samples include addition of an n-type dopant at various concentrations: 0.64 mM and 3.2 mM BV; and 0.64 mM and 3.2 mM phenyl hydrazine (PHz). As in FIG. 2, the peak intensity is directly related to the SWCNT concentration. In addition, the value (which is a measure of the sc-SWCNT purity) from the supernatant of the second extraction for each sample is shown. Here, the value is the ratio of the absorption band of sc-SCWNT peaks to the background which reflects the purity of enriched SWCNTs, and a higher value means a better sc-SWCNT purity level.

With regards to the effect of the addition of an n-type dopant on the CPE process, clearly the addition of PHz or BV dramatically improves the yield of CPE process. For the control sample, the yield for the first extraction is 0.46%, while the total yield of the first four extractions is 3.39%. A higher yield of 2.82% occurs in the fifth extraction in the control sample. However, when a very small amount of PHz or BV (0.64 mM) is added, the yield of after the second extraction is 3.65% and 4.24% respectively. Furthermore, the yield after the first four extractions is over 10%, compared to 3.39% in the absence of dopants. FIG. 3 also illustrates that the yield improves with an increase in n-type dopant concentration: $\eta$=3.65% for 0.64 mM PHz, but increases to 5.63% for 3.2 mM PHz. Similarly, $\eta$=4.24% for 0.64 mM BV, but increases to 5.04% for 3.2 mM BV.

The sc-SWCNT purity decreases slightly decrease with the addition of an n-type dopant: =0.402 for the control, but decreases to 0.359 for 0.64 mM PHz and 0.314 for 0.64 mM BV. In the case of PHz, an increase in the concentration from 0.64 mM to 3.2 mM results in reduction of sc-SWCNT purity from =0.359 to =0.0.221. On the other hand, a very slight increase in the value is seen as the BV concentration increases from 0.64 mM to 3.2 mM. Nonetheless, addition of an n-type dopant results in a loss of sc-SWCNT purity relative to the control sample without n-type dopant.

Figure 4:
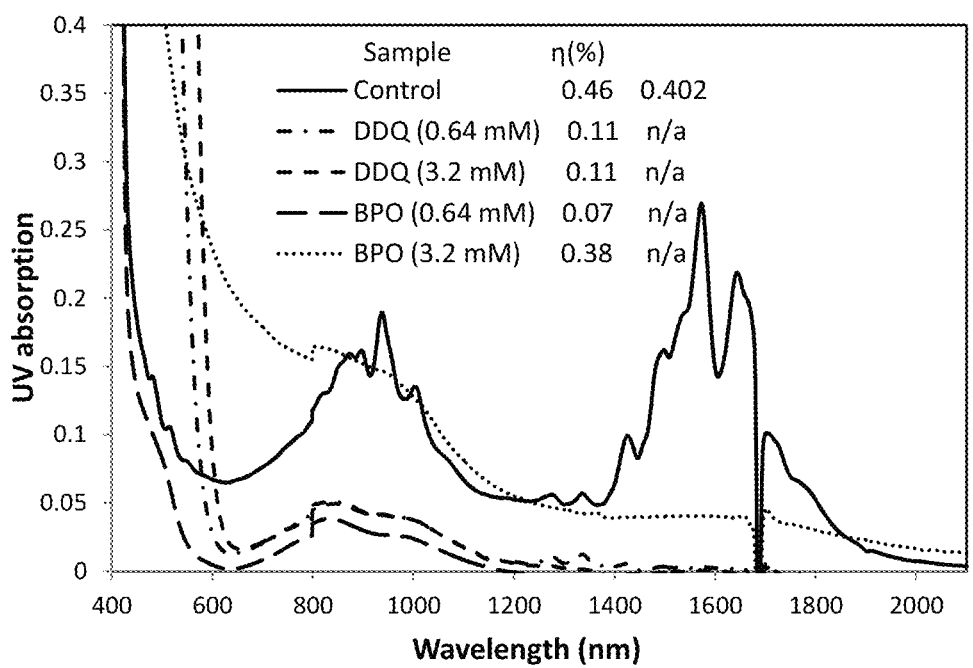
FIG. 4 illustrates UV-absorption spectra of an enriched SWCNT dispersion for a control sample compared to samples with p-type doping agents.

FIG. 4 illustrates absorption spectra of an enriched SWCNT dispersion for a control sample compared to samples with p-type doping agents after a second extraction. The control sample is an enriched SWCNT dispersion in toluene from a second extraction using PFDD, without the use of a dopant. The four remaining samples include addition of an n-type dopant at various concentrations: 0.64 mM and 3.2 mM 2,3-dichloro-5,6-dicyano-p-benzoquinone (DDQ); and 0.64 mM and 3.2 mM BPO. As in FIG. 2, the peak intensity is directly related to the SWCNT concentration. In addition, the value (which is a measure of the sc-SWCNT purity) from the supernatant of the second extraction for each sample is shown.

With regards to the effect of the addition of a p-type dopant on the CPE process, clearly the addition of DDQ or BPO dramatically reduces the yield of CPE process. For the control sample, the yield for the first extraction is 0.46%. However, when a very small amount (0.64 mM) of DDQ or BPO is added, the yield of after the second extraction is 0.11% and 0.07% respectively. Furthermore, the yield after the first four extractions is over 10%, compared to 3.39% in the absence of dopants. FIG. 4 also illustrates that the yield may or may not improve with an increase in p-type dopant concentration: $\eta=0.11\%$ for 0.64 mM DDQ, and remains the same when the DDQ concentration is increased to 3.2 mM. On the other hand $\eta=0.07\%$ for 0.64 mM BPO, but increases to 0.38% for 3.2 mM BPO. Nonetheless, the yield still remains less than that of the control.

Figure 5:
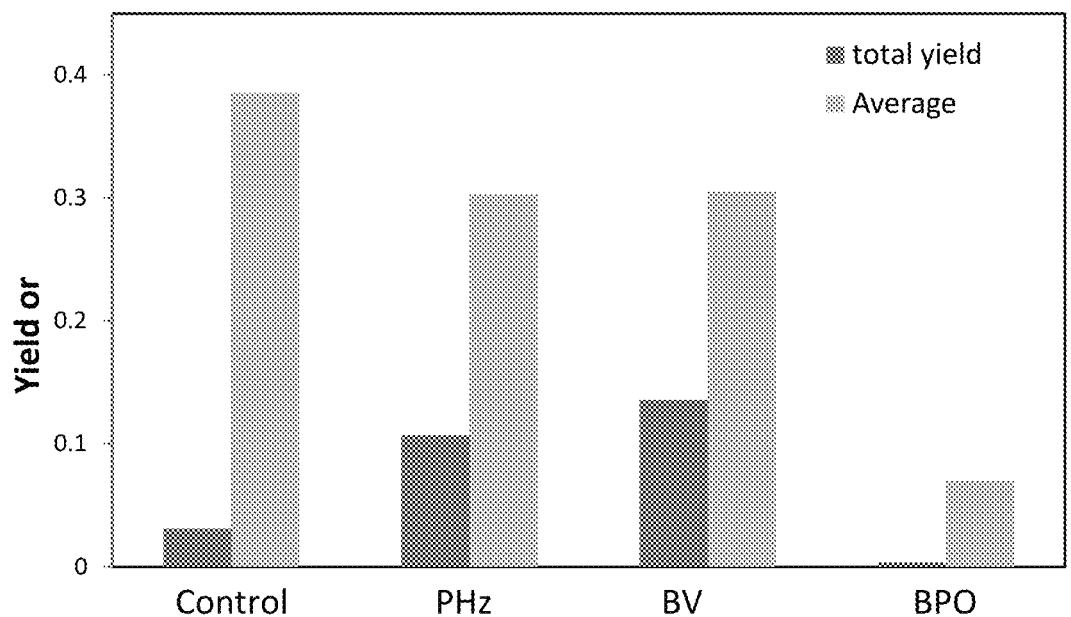
FIG. 5 illustrates the total yield (from four extractions) and purity of a SWCNT dispersion from a CPE process with, and without addition of different doping agents.

While n-type and p-type doping agents have opposite effects on the yield, the same is true for purity. FIG. 5 illustrates that n-type doping agents reduce the purity of the SWCNTs that result from the extraction process relative to the regular CPE process, since the SWCNTs should be slightly p-doped in ambient conditions. Specifically, the total yield (from 4 extractions) and value of the SWCNT dispersion from CPE process without and with the addition of different doping agents (PHz, BV and BPO) are shown in FIG. 5, with the PFDD polymer/tube ratio equal to 1, and the amount of doping agent added is 0.008 mmol per 10 mg raw materials. Clearly, addition of an n-type doping agent can boost the yield by 3-4 times, while the purity only slightly drops (compared to the regular CPE process). On the other hand, addition of a small amount of BPO gives very low yield, while the product is a mixture of sc- and m-SWCNTs.

Figure 6:
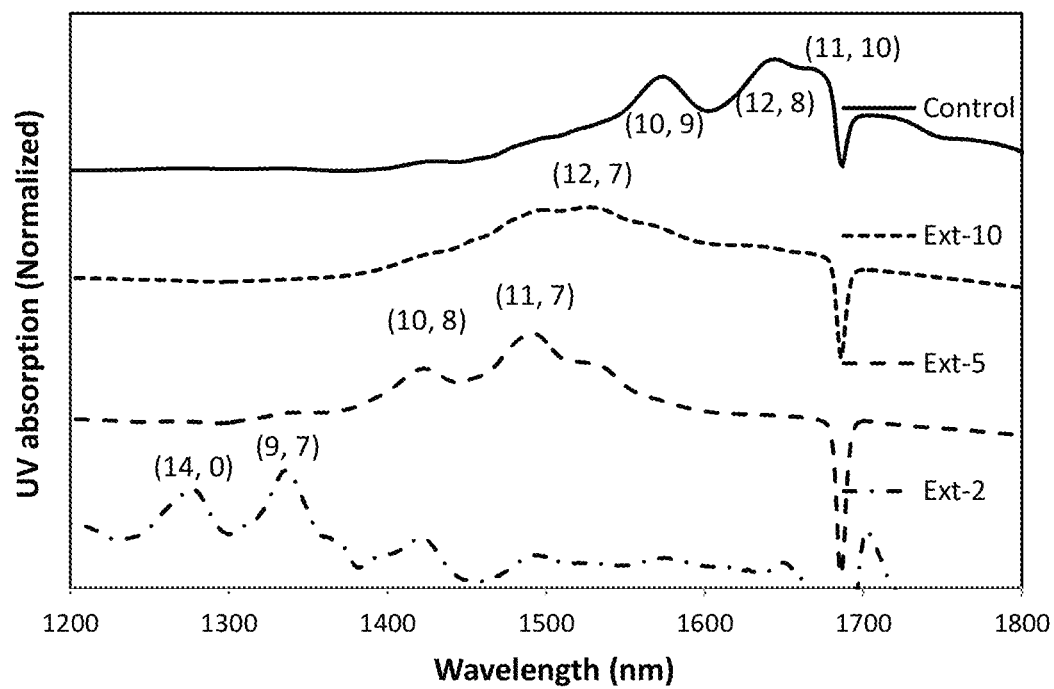
FIG. 6 is the UV-absorption spectra of the supernatants for the PFDD extractions of SWCNTs in the presence of 0.64 mM DDQ.

It should be pointed out in FIG. 4, that the quench of bands at S11 (1200-1900 nm) is due to an increased p-doping level, while the bands at S22 (700-1100) are not be affected with the addition of these dopants. In addition, two small peaks at 1275 and 1335 nm emerged in the spectrum of second extraction when 0.64 mM DDQ was added. CPE was carried out on this precipitate and the normalized spectra are shown in FIG. 6, which illustrates chirality selectivity: small-diameter tubes ((14,0) or (9,7)) come out first, followed by middle-diameter tubes ((10,8) and (11,7)) followed by large-diameter tubes ((10,9), (12,8) and (11,10)). Such chirality selectivity during the CPE process allows for the production of very narrow or single chirality products.

Figure 7:
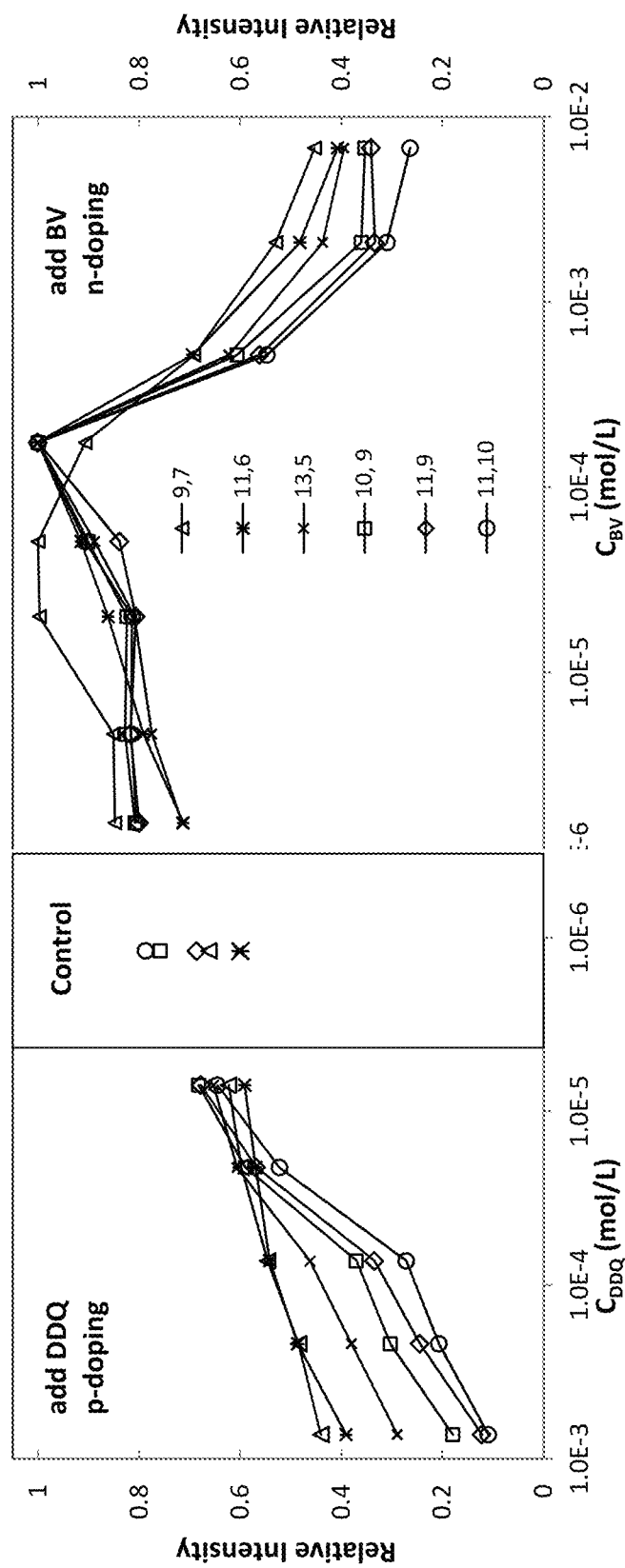
FIG. 7 is the relative fluorescence intensity of six sc-SWCNT species in a PFDD-toluene solution with the addition of p-dopant DDQ or n-dopant BV.

Photoluminescence excitation (PLE) mapping titration provides further insight on the doping level of SWCNTs in relation to their diameters, chiralities and redox potentials. FIG. 7 illustrates the relative fluorescence intensity of six sc-SWCNT species in a PFDD-toluene solution with the addition of p-dopant DDQ or n-dopant BV.

At ambient conditions, the SWCNTs are slightly p-doped due to the $H_2O/O_2$ redox coupling. Therefore, addition of n-dopant BV first neutralizes the p-doping effect; as such, the fluorescence intensity correspondingly increases with increasing BV concentration. The fluorescence intensity reaches a plateau when the BV concentration is near $1.75\times 10^{-4}$ mol/L and the ratio of BV/C atoms in the SWCNTs is 1/3.8. At this point, the sc-SWCNTs reach an electrically neutral state as the valence band is completely filled, while conduction band is empty. Further addition of BV leads to the rapid decrease of fluorescence intensity due to n-doping as the conduction band is partially filled with electrons donated by the n-dopant.

On the other hand, addition of the p-dopant DDQ to the control sample reduces the fluorescence intensity of the tubes due to enhanced p-doping. More importantly, the decrease of the fluorescence intensity of large-diameter tubes is faster than that of small-diameter tubes at the same dopant concentration.

Figure 8:
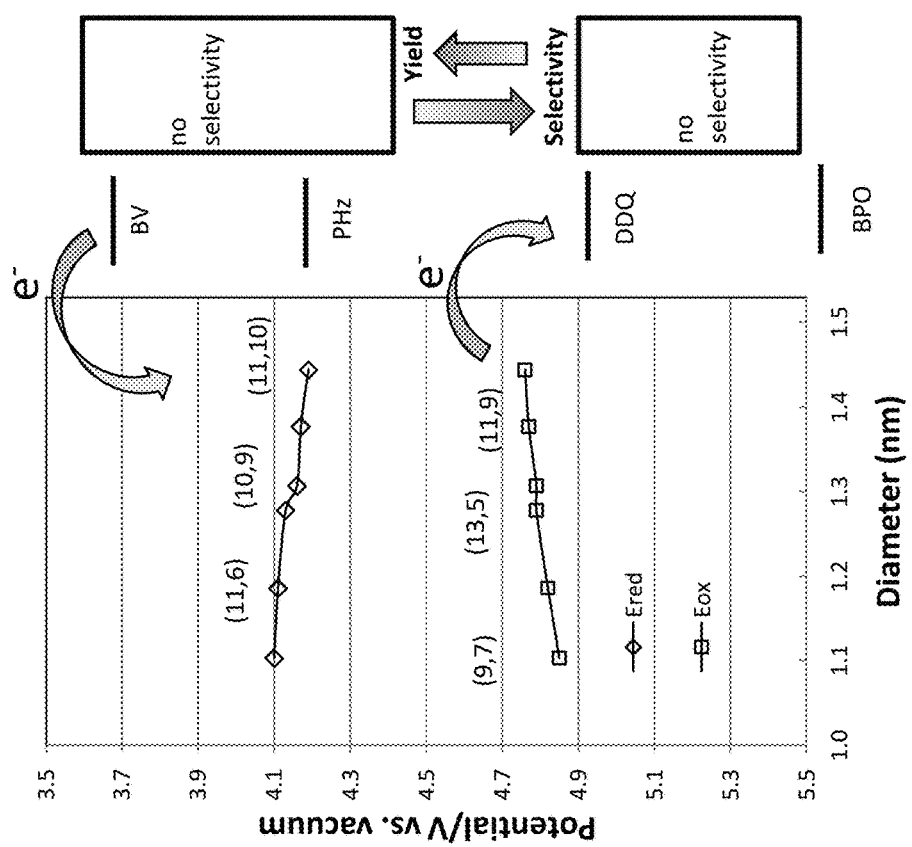
FIG. 8 illustrates reduction and oxidation potentials of (n,m) SWCNTs as a function of nanotube diameter.

FIG. 8 provides a schematic of a possible mechanism of CPE of SWCNTs under different redox states. The redox potentials of six representative sc-SWCNTs and dopants are shown in FIG. 8. The right-hand side scheme shows the relationship of the selectivity and yield of the CPE process on the SWCNT samples to the Feimi level of each system.

Under highly p/n doped conditions, all of the m/sc tubes will be either highly positively- or negatively-charged; the electrostatic repulsion between tubes will dominate their interaction. As such, there is no selective bundling between the tubes (i.e. tubes of a certain diameter or m-SWCNTs will not selectively bundle together) and the CPE loses selectivity.

At ambient conditions, however, the tubes are slightly p-doped due to $H_2O/O_2$ redox coupling. Their doping level can be adjusted by the addition of p/n-type dopants. With the addition of n-type dopants (BV or PHz), the yield is improved at a cost of selectivity, corresponding to the gradual removal of the slightly p-doped state. This trend continues until the tubes reach a neutral state, after which the CPE rapidly loses selectivity. The effect of PHz is more pronounced as it is not only an n-type dopant, but also an efficient oxygen scavenger.

On the other hand, the addition of p-dopants to the CPE process gives a poor yield, yet chiral selectivity can be obtained under certain conditions. As shown in FIG. 8, the oxidation potential of DDQ is closer to that of the sc-SWCNTs than BPO. The addition of a small amount of DDQ will only selectively p-dope larger diameter tubes, so that the small diameter tubes can be extracted out first, which agrees with the PLT results shown in FIG. 6. This also demonstrates that chirality-selective redox chemistry may provide a measure of control on separation. While BPO is a stronger p-type dopant than DDQ (due to their oxidation potentials relative to the oxidation potentials of the tubes), its addition dopes all kinds of sc-tubes; As such, there is minimal chiral selectivity observed during the CPE.

The schematic shown in FIG. 8 indicates that yield and selectivity may be effectively adjusted in the CPE process with the addition of dopants within the middle region of the Figure, where the Feimi level of the system is located between 4.47 eV (neutral state for SWCNTs) and ~5.0 eV (medium p-doped). At ambient conditions, the CPE is located in a region with high selectivity and median yield. With the addition of 0.64 mM BPO, the total yield of first four extractions is only 0.4%, which means almost all the tubes form bundles and precipitate out at this doping level. These results suggest that the p-doping level of sc-SWCNTs determines their bundling tendency and thus their solubility in a PFDD/toluene solution. For m-SWCNTs, the change of their electrical properties is less pronounced within this range considering their much larger band gaps and continuous electrical density of state.

For SWCNTs, PFDD is akin to a neutral polymer; there is no obvious charge transfer between the PFDD and the SWCNTs. However, for other conjugated polymers containing electron donating or withdrawing groups, or conjugated polymers with charges, the charge transfer should be considered when regarding their interaction with the tubes. This kind of interaction is similar to that of n-type and p-type dopants. However, this effect is much weaker compared with the addition of strong small-molecule p/n-type doping agents, considering their relative quantities.

In conclusion, at a highly n/p doped state, electrostatic repulsion dominates and both m/sc tubes are extracted out without any selectivity. In a medium p-doped to neutral-state range, m-SWCNTs have very low solubility while the solubility of sc-SWCNTs is related to their p-doping level, which is further determined by their diameters/chiralities, redox potential and concentration of dopants. With a sufficient p-doping level, the sc-SWCNTs enough positive charge to induce polar-polar interactions, preferentially with m-tubes which have roughly 100 times larger polarizability. The bundling energy between tubes is very sensitive to their doping level and can provide better control on electrical type or diameter selectivity.

Of course, it should be appreciated that the above examples only provide an illustration of the inventive subject matter and should not be deemed limiting. Thus, specific embodiments and applications of methods have been disclosed. It should be apparent to those skilled in the art that many more modifications besides those already described are possible without departing from the inventive concepts herein. The inventive subject matter, therefore, is not to be restricted except in the spirit of the appended claims.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

We claim:

1. A method for modulation of yield and semiconducting (sc)-purity of single-walled carbon nanotubes (SWCNTs) in a conjugated polymer extraction (CPE) process, the method comprising addition of a dopant to the CPE process, the dopant being an n-type dopant or a p-type dopant, wherein:
   the n-type dopant has a reduction potential of between −4.2 eV and −3.0 eV;
   or
   the p-type dopant has a reduction potential of between −6.0 eV and −4.5 eV,
   wherein the dopant concentration is between 0.001 mM and 100 mM.

2. The method of claim 1, wherein the weight ratio of the dopant to the SWCNTs is from about 0.0001 to about 100.

3. The method of claim 1, wherein the atom ratio of the dopant to the carbon of the SWCNTs is from about 0.0001 to about 0.5.

4. The method of claim 1, wherein the conjugated polymer has the structure:

where x=0, 1, 2, 3, 4 and y=0, 1, 2, 3, 4, such that x and y do not both=0; m=5-50000;
and A and B are repeating units, that are independently selected from thiophene, bithophene, phenylene, pyridine, bipyridine, anthracene, naphthalene, benzothiadiazole, benzanthracene, ketone, carbazole, fluorene, spirobifluorene, phenathrene, dehydrophenathrene, triazine, imidazole, tetrazine, pyrimidine, pyridazine, pyrazine, oxadiazole, quinolone, quinoxaline, pyrene, perylene, benzimidazole, phosphinoxide, phenazine, phenanthroline, triarylborane, 1,4-phenylene-dinitrilomethine and derivatives thereof.

5. The method of claim 4, wherein A and B are repeating units, that are independently selected from thiophene, pyridine, benzothiadiazole, fluorine and derivatives thereof.

6. The method of claim 4, wherein A and B are repeating units that are independently

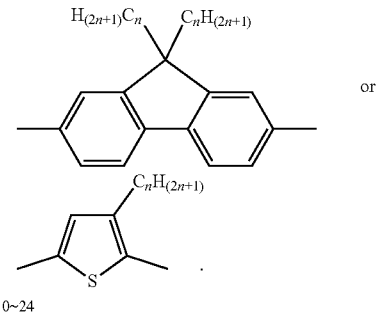

n = 10~24

7. The method of claim 1, wherein addition of the n-type dopant increases the yield of SWCNTs of the CPE process.

8. The method of claim 1, wherein addition of the p-type dopant increases the sc-purity or chiral selectivity of CPE process.

9. A method for enhancement of yield of sc-SWCNTs in a conjugated polymer extraction (CPE) process, the method comprising addition of an n-type dopant to the CPE process, wherein the n-type dopant has a reduction potential between −4.2 eV and −3.0 eV, and wherein the n-type dopant concentration is between 0.001 mM and 100 mM.

10. The method of claim 9, wherein the n-type dopant is phenyl hydrazine or benzyl viologen.

11. The method of claim 9, wherein the conjugated polymer has the structure:

where x=0, 1, 2, 3, 4 and y=0, 1, 2, 3, 4, such that x and y do not both=0; m=5-50000;
and A and B are repeating units, independently optionally substituted, that are independently selected from thiophene, bithophene, phenylene, pyridine, bipyridine, anthracene, naphthalene, benzothiadiazole, benzanthracene, ketone, carbazole, fluorene, spirobifluorene, phenathrene, dehydrophenathrene, triazine, imidazole, tetrazine, pyrimidine, pyridazine, pyrazine, oxadiazole, quinolone, quinoxaline, pyrene, perylene, benzimidazole, phosphinoxide, phenazine, phenanthroline, triarylborane, 1,4-phenylene-dinitrilomethine and derivatives thereof.

12. The method of claim 11, wherein A and B are repeating units, independently optionally substituted, that are independently selected from thiophene, pyridine, benzothiadiazole and fluorene.

13. The method of claim 11, wherein A and B are repeating units that are independently

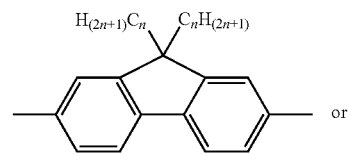

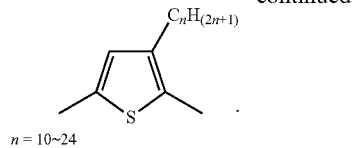

n = 10~24

14. A method for enhancement of sc-purity or chiral selectivity of single-walled carbon nanotubes (SWCNTs) in a conjugated polymer process (CPE), the method comprising addition of a p-type dopant to the CPE process, wherein the p-type dopant has reduction potential of between −6.0 eV and −4.5 eV, and wherein the p-type dopant concentration is between 0.001 mM and 100 mM.

15. The method of claim 14, wherein the p-type dopant is benzoyl peroxide (BP) or 2,3-dichloro-5,6-dicyano-p-benzoquinone (DDQ).

16. The method of claim 14, wherein the conjugated polymer has the structure:

-[A$_x$-B$_y$]$_m$-, where x=0, 1, 2, 3, 4 and y=0, 1, 2, 3, 4, such that x and y do not both=0; m=5-50000;

and A and B are repeating units, independently optionally substituted, that are independently selected from thiophene, bithophene, phenylene, pyridine, bipyridine, anthracene, naphthalene, benzothiadiazole, benzanthracene, ketone, carbazole, fluorene, spirobifluorene, phenathrene, dehydrophenathrene, triazine, imidazole, tetrazine, pyrimidine, pyridazine, pyrazine, oxadiazole, quinolone, quinoxaline, pyrene, perylene, benzimidazole, phosphinoxide, phenazine, phenanthroline, triarylborane, 1,4-phenylene-dinitrilomethine and derivatives thereof.

17. The method of claim 16, wherein A and B are repeating units, independently optionally substituted, that are independently selected from thiophene, pyridine, benzothiadiazole and fluorene.

18. The method of claim 16, wherein A and B are repeating units that are independently

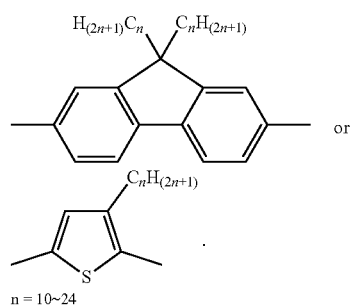

n = 10~24

* * * * *